United States Patent Office 2,938,897
Patented May 31, 1960

2,938,897

PRODUCTION OF AZOIC PIGMENTS

William H. Armento, Albany, N.Y., assignor to General Aniline & Film Corporation, New York, N.Y., a corporation of Delaware No Drawing. Filed Dec. 28, 1955, Ser. No. 555,792

11 Claims. (Cl. 260—159)

This invention relates to the production of azoic pigments, and more particularly to the production of azoic pigments in a readily filterable, flocculant form adapted for use in the spin dyeing of synthetic fibers and films.

Since the crystal structure of pigments to be employed in the spin dyeing of synthetic fibers and films is of utmost importance, various methods have been employed to improve or modify the crystal structure. A freshly prepared suspension of the azoic ice color coupling component is commonly resorted to, which suspension may or may not be prepared in the presence of a surface active agent, the chief function of the surface active agent being to improve the suspension of the coupling component. It is customary also to digest the freshly prepared pigment by heating in order to improve the crystal structure. A surface active agent is frequently employed during the digestion to regulate the crystal size, i.e., to prevent the formation of large crystals. The pigment, in crystalline form is then filtered and dried.

The usual crystalline pigments are excellent for use in making lakes, or for use in paints and similar vehicles, but for use in dope solutions for spin dyeing, wherein the colored spinning solution is forced through the minute holes of the spinneret, the larger crystals present frequently clog the spinneret and cause difficulties. However, the direct production of pigment crystals having the desired uniformity and size of particles is extremely difficult. On the other hand, if the crystals produced are too small, it is difficult to isolate them by filtration, while if they are too large, even a stringent grinding operation may not suffice to shear and break the crystals down to the desired particle size. In an ideal pigment composition for use in spin dyeing, the size of the individual particles should be no more than 1 micron. For practical purposes, the size of at least 95% of the particles should be less than 1 micron, with none larger than 3 microns. This size particle is very difficult to filter.

It is an object of this invention to provide a process for the production of azoic pigments in the form of soft and loose flocks. Another object of this invention is the provision of a process for the production of azoic pigments in a flocculant form which is readily filterable. Other objects and advantages will appear as the description proceeds.

The attainment of the above objects is made possible by the instant invention which comprises coupling a diazotized primary aromatic amine compound devoid of water-solubilizing groups with an azoic ice color coupling component devoid of water-solubilizing groups and selected from the group consisting of acylacetarylides, pyrazolones, and aromatic hydroxy compounds capable of coupling, in an aqueous bath containing a water-soluble anionic surface active agent selected from the group consisting of organic sulfates and sulfonates of at least 9 carbon atoms, and then heating the aqueous bath at a temperature of about 90 to 103° C. until the azoic pigment is produced in a readily filterable flocculant form, said surface active agent being employed in an amount ranging from about 25 to 175 g. per gram mole of azoic pigment. Within this range, the proportion of surface active agent employed in the instant process will depend primarily upon the character of said agent and of the pigment.

If too large an amount of surface active agent is employed in the process of this invention, a very fine pigment suspension is formed which, however, does not clump, flocculate or form a filterable aggregate even after considerable digestion by heating. In the absence of the surface active agent, the azoic pigment tends to take the form of large hard crystals. If the surface active agent is employed in too small an amount, the azoic pigment is produced in a particle size larger than one micron, which is extremely difficult to reduce to a smaller size, even with stringent grinding methods. In the instant invention, an amount of anionic surface active agent must be employed during combination of the diazo component with the coupling component which initially produces a very fine, non-filterable suspension of azoic pigment having the desired particle size prior to digestion, which pigment particles on subsequent digestion in the same bath aggregate, clump or flocculate to form a readily filterable product which does not have a well defined crystal structure and which is also soft and loose and can be readily and without stringent grinding broken up into small, homogeneous particles readily adapted for use in the spin dyeing of synthetic fibers and films. When the clumps or flocks produced in accordance with the instant invention are examined under a magnification of 60,000, there is no visible sign of crystal structure. The structure is that of homogeneous, rather loose flocks, free from visible crystalline structure. As a result of the instant process, the filtered pigment paste (presscake) is composed of particles the size of 95% of which are less than 1 micron, with none larger than 3 microns, and can be used directly without an intermediate grinding operation. In some instances, it may be advisable to mill the paste mildly in order to break up large clumps and render it somewhat more homogeneous in flock size, but this is not to be confused with a stringent grinding operation usually employed in processes designed to break up large crystals into smaller crystals.

The process of the instant invention is concerned with the production of azoic pigments of the type which are insoluble in water, do not dissolve readily in water even in the form of their salts, and are substantially insoluble in organic solvents. Such pigments are produced by coupling a diazotized primary aromatic amine compound (diazo component) devoid of water-solubilizing groups such as carboxylic or sulfonic acid groups with an azoic ice color coupling component also devoid of water-solubilizing groups. These diazo and coupling components and their methods of production are well known in the art.

The coupling components operative in the production of the azoic pigments in accordance with the instant invention may be characterized as compounds devoid of solubilizing groups and having an active methylene group or an aromatic hydroxy group inducing coupling, usually in ortho- or para-position, preferably the former, to said hydroxy group. Such compounds are typified by the acylacetarylides, the pyrazolones, and aromatic hydroxy compounds capable of coupling. As acylacetarylides there may be mentioned acetoacetic acid arylides, furoyl acetic acid arylides, terephthaloyl-bis-acetic acid arylides, and the like. As pyrazolones, there may be mentioned 1-phenyl-3-methyl-5-pyrazolone, 1 - p-tolyl-3-methyl-5-pyrazolone, 3-methyl-5 - pyrazolone, 5 - pyrazolone, 1,3 - dimethyl-5-pyrazolone, 1-(p-chlorophenyl)-3 - methyl-5-pyrazolone, 1-(p-nitrophenyl)-3-methyl-5-pyrazolone, 1-(o-methoxyphenyl)-3-methyl-5-pyrazolone, 1 - methyl - 5-pyrazolone, 1-phenyl-5-pyrazolone, 1-phenyl-5-pyrazolone-3-carboxylic acid methyl ester, 1-phenyl-5-pyrazolone-3-carboxylic acid ethyl ester, and other pyrazolones unsubstituted or substituted in the 1- and/or 3-positions by non-solubilizing radicals. The aromatic (carbocyclic or heterocyclic) hydroxy compounds useful as coupling components herein generally include phenols, 1- and 2-naphthols, benzonaphthols, hydroxybenzofluorenones, and the like, in addition to arylides of β-hydroxy aromatic carboxylic acids. Illustratively, examples of arylides of β-hydroxy aromatic carboxylic acids which may be employed in the process of the instant invention are 3-hydroxy-2-naphthoic acid arylides, 3-hydroxy-2-anthroic acid arylides, 2-hydroxy-3-carbazole carboxylic acid arylides, 3-hydroxy - 2 - dibenzofurane carboxylic acid arylides, 2-hydroxy - 11H - benzo[a] - carbazole - 3 - carboxylic acid arylides, hydroxydibenzothiophene carboxylic acid arylides and the like. Many such coupling components operative herein are disclosed in Diserens, "Chemical Technology of Dyeing and Printing," volume 1, pages 213 to 224 (Reinhold Publishing Corp., 1948); Lubs, "Chemistry of Synthetic Dyes and Pigments," pages 182 through 192 (Reinhold Publishing Corp., 1955); and Adams, "Journal of the Society of Dyers and Colorists," volume 67 (1951), beginning at page 223.

The aqueous solution containing the coupling component is prepared by dissolving the coupling component with sufficient alkali, such as sodium or potassium hydroxide, to form the alkali metal salt of the coupling component. With some coupling components, the addition of a small amount of a water-soluble organic solvent such as ethyl alcohol, isopropyl alcohol, ethylene glycol or its monoethyl ether or the like may be desirable to facilitate solution thereof.

As examples of primary aromatic amine compounds devoid of solubilizing groups which may be employed as diazo components for reaction with the above mentioned coupling components, there may be mentioned aminoazotoluene, 4-chloro-2-nitroaniline, 5-chloro-o-toluidine, 4-nitro-o-toluidine, 2,5-dichloroaniline, 4-benzamido-2,5-diethoxyaniline, 4-nitro-m-anisidine, 4-nitro-o-anisidine, 4-chloro-o-anisidine, 1 - aminonaphthalene, 1 - aminoanthraquinone, dianisidine, 5-chloro-4-nitro-o-anisidine, aminobenzophenones, aminosulfones such as aminobenzosulfones and aminodiphenylsulfones, aminodiphenyl ethers, aminocarbazoles, and other similar cyclic compounds containing at least one diazotizable primary amine group. These and other carbocyclic and heterocyclic azoic bases operative in the process of this invention are well known in the art.

The above-mentioned diazotizable primary amine compounds are diazotized in known manner, for example by treatment with sodium nitrite and acid, for coupling with the above-mentioned coupling components. The diazo compound may be employed as a solution freshly prepared from a diazotizable amine or as a solution of one of its stabilized salts, e.g. as a hydrochloride or sulfate of one of the relatively stable diazos, as a soluble salt employing such salts as zinc chloride, zinc sulfate, cadmium chloride, tin tetrachloride, fluoroborates and the like, or as a salt with an organic sulfonic acid such as benzenedisulfonic acid α-naphthalene-sulfonic acid and naphthalene-trisulfonic acid. In some instances wherein solubility may be insufficient a dispersing agent may be added to improve dispersion and penetration. Or the said amine may be in the form of its nitroso compound or as the stabilized diazo amino compound, e.g. the Levamines. All of these forms of stabilized diazotized primary amino compounds or nitrosoamines are to be regarded as the equivalent of the freshly prepared diazotized primary amine compounds since they react as such with the coupling component. The diazo component should be reacted with an approximately molecularly equivalent amount of ice color coupling component.

The coupling reaction is carried out in known manner, as for example by adding the solution containing the diazo component into the solution containing the coupling component, or vice versa. The anionic surface active agent required in the instant invention should be added to either of these solutions prior to their mixture, although it is preferred to dissolve it in the solution containing the ice color coupling component.

The water-soluble anionic surface active agents which may be employed in carrying out the process of the instant invention are well known in the art and are in general organic sulfates and sulfonates containing at least nine carbon atoms. Included in this group are the alkyl arylsulfonates such as dodecylbenzene sulfonate, isopropylnaphthalene sulfonate, diisobutylnaphthalene sulfonate, and the like, N-higher acyl taurines such as N-oleoyl-N-methyl taurine, N-tallow acyl-N-methyl taurine, N-tall oil acyl N-ethyl taurine, N-palmitoyl-N-methyl taurine, and the like, higher aliphatic sulfates and sulfonates such as lauryl sulfate, OXO tridecyl sulfate, sulfonated and sulfated castor oil, and the like, higher fatty acid esters of isethionic acid and the like and sulfonated polycarboxylic acid esters such as diamyl sulfosuccinate, dioctylsulfosuccinate, and the like. Excellent results have also been obtained with formaldehyde naphthalene sulfonates, such as sodium formaldehyde naphthalene sulfonate which is available on the market as "Tamol NNO" and the like. All of these sulfates and sulfonates are preferably employed in the form of their alkali metal salts with sodium or potassium, although other salts may be employed such as those with alkaline earth metals such as magnesium, ammonia or amines such as methylamine, ethanolamine, cyclohexylamine, morpholine, piperidine, and the like.

As stated above, the coupling reaction between the diazo component and the ice color coupling component is carried out in the presence of from about 25 to 175 grams of the anionic surface active agent per gram mole of the azoic pigment. At the end of the coupling reaction, the azoic pigment is produced in the form of a very fine, non-filterable dispersion. The aqueous bath containing the pigment and anionic surface active agent is then heated at a temperature of from about 90 to 103° C. until flocculation occurs. In general, digestion for from ½ to 2 hours is sufficient. While temperatures varying somewhat from the above-mentioned range may be employed, it is preferred to carry out the digestion at the boil, whereby temperature control is facilitated. The flocculate is then filtered off and may be employed as such or subjected to a mild milling operation to break up large clumps and render the product somewhat more homogeneous in flock size.

The following examples, in which parts are by weight unless otherwise indicated are illustrative of the instant invention and are not to be regarded as limitative. As indicated above, the weight ratio of surface active agent to pigment to be employed in the process of this invention will depend primarily upon the nature of said agent and pigment. Thus, for optimum results, such proportion may vary from about 75 to 125 g. of such agent per gram mole of pigment in Example 1 below, from about 35 to 70 g. per g. mole of pigment, in Examples 2 and 3 below, and from about 100 to 175 g. per gram mole of pigment in Example 4 below.

Example 1

125 cc. water, 12.9 g. $N^1,N^1$-diethyl-4-methoxymetanilamide and 25 cc. hydrochloric acid 20° Bé. were stirred to solution and then cooled to 9° C. 3.5 cc. sodium nitrite (31.5% solution) was stirred in. The diazo was clarified by treatment with an absorbent earth and filtered, while maintaining the temperature below 5° C. To this was then added 1 g. Emulphor ON (polyoxyethylene ether of a higher fatty alcohol).

To 500 cc. water were added 19.5 g. 3-hydroxy-2-naphthoic acid-5-chloro-2,4-dimethoxyanilide and 6 cc. caustic soda (30% by weight solution). After heating to solution the charge was cooled to room temperature. 6 g. sodium acetate and 5 g. Tamol NNO dissolved in a little warm water were added.

This coupler solution was run rapidly into the diazo solution and the bath stirred for an hour. A very fine dispersion of pigment had been formed. The charge was heated to the boil and boiled one hour during which time a definite flocculation occurred. The charge was carefully and slowly filtered and washed.

To finish the pigment the material was mixed with Tamol NNO (10% of the weight of the presscake) dissolved in about 3 times as much warm water and the product passed over a roller mill and screened. The product, containing particles the size of 99% of which were less than 1 micron, was in the form of loose soft flocks well adapted for addition to dope solutions in producing extruded fibers and films.

*Example 2*

15.2 g. 2-nitro-p-toluidine was stirred into 100 cc. water and 30 cc. HCl (20° Bé.) and cooled to 0° C. To this was added 50 cc. sodium nitrite (2 N solution). After stirring for 1 hour at 0–5° C., the charge was clarified by treatment with an absorbent earth and filtered.

18.5 g. acetoacetanilide was stirred to solution in 250 cc. water and 11 cc. caustic soda solution (40% by weight). 250 cc. water, 20 g. sodium acetate and 2.5 g. Tamol NNO as a 10% solution were added and the solution stirred for ½ hour. 66 cc. acetic acid 10% was stirred in. The above diazo solution was run into this coupler solution during 1 hour with high speed agitation. After standing for 3 hours, the acidity was checked and adjusted to Congo acid. The bath was then heated at 96° C. for 1 hour, and the flocculate filtered and washed.

In order to properly finish the pigment, to 9.2 g. of the presscake was added .1 g. Tamol NNO in 1.8 cc. warm water and the slurry was run over a roller mill and screened. A high quality pigment was obtained in the form of soft, loose flocks.

*Example 3*

The process of Example 2 was repeated, but employing 6-nitro-m-toluidine instead of 2-nitro-p-toluidine. Similar results were obtained.

*Example 4*

14.15 g. 4-chloro-o-toluidine was stirred into 250 cc. water and 25 cc. HCl (20° Bé.) and cooled to 5° C. To this was added 18 cc. sodium nitrite (38.5% solution). After stirring 1 hour at 5°–10° C., the solution was clarified by treatment with an absorbent earth and filtered.

29.0 g. 4-chloro-2,5-dimethoxyacetoacetanilide and 1.0 g. Emulphor ON were stirred into 200 cc. water. 6.0 cc. caustic soda (30% by weight solution) and 17.5 g. Tamol NNO were added and heated to solution at 60°–65° C. 6 g. sodium acetate was added, stirred to solution and the whole cooled to 15° C.

The diazo solution was run into the coupler solution and the batch stirred overnight, a very fine dispersion of pigment having been formed. The next morning, the charge was heated to the boil for one hour to flocculate the color. The batch was then filtered and washed.

To complete the operation, 20 g. of the presscake was treated with 2.5 g. Blancol (naphthalene sulfonic acid condensate), and mixed in a paste blender. A high quality pigment was obtained in sub-micron particle size.

This invention has been disclosed with respect to certain preferred embodiments, and various modifications and variations thereof will become obvious to the person skilled in the art. It is to be understood that such modifications and variations are to be included within the spirit and purview of this application and the scope of the appended claims.

I claim:

1. In the process for producing pigments of the azo class wherein a freshly prepared unstabilized diazotized primary aromatic amine compound devoid of water-solubilizing groups is coupled with an azoic ice color coupling component devoid of water-solubilizing groups and selected from the group consisting of acylacetarylides, pyrazolones, and aromatic hydroxy compounds capable of coupling; the improvement which comprises effecting the coupling by admixing an aqueous bath containing said freshly prepared unstabilized diazotized compound with aqueous bath containing said coupling component and a water-soluble anionic surface active agent selected from the group consisting of organic sulfates and sulfonates of at least 9 carbon atoms, and then heating the resulting aqueous bath at a temperature of about 90 to 103° C. until the azoic pigment is produced in a readily filterable flocculant form, said surface active agent being employed in an amount ranging from about 25 to 175 g. per gram mole of azoic pigment.

2. A process as defined in claim 1 wherein said surface active agent is sodium formaldehyde-naphthalene sulfonate.

3. A process as defined in claim 1 wherein said coupling component is an acylacetarylide.

4. A process as defined in claim 1 wherein said coupling component is a pyrazolone compound.

5. A process as defined in claim 1 wherein said coupling component is an aromatic hydroxy compound capable of coupling.

6. In the process for producing pigments of the azo class wherein freshly prepared unstabilized diazotized $N^1,N^1$-diethyl-4-methoxymetanilamide is coupled with 3-hydroxy-2-naphthoic acid-5-chloro-2,4-dimethoxyanilide; the improvement which comprises effecting the coupling by admixing an aqueous bath containing said freshly prepared unstabilized diazotized compound with aqueous bath containing said 3-hydroxy-2-naphthoic acid compound and a water-soluble anionic surface active agent selected from the group consisting of organic sulfates and sulfonates of at least 9 carbon atoms, and then heating the resulting aqueous bath at a temperature of about 90 to 103° C. until the azoic pigment is produced in a readily filterable flocculant form, said surface active agent being employed in an amount ranging from about 75 to 125 g. per gram mole of azoic pigment.

7. A process as defined in claim 6 wherein said surface active agent is sodium formaldehyde-naphthalene sulfonate.

8. In the process for producing pigments of the azo class wherein a freshly prepared unstabilized diazotized nitrotoluidine is coupled with acetoacetanilide; the improvement which comprises effecting the coupling by admixing an aqueous bath containing said freshly prepared unstabilized diazotized compound with aqueous bath containing said acetoacetanilide and a water-soluble anionic surface active agent selected from the group consisting of organic sulfates and sulfonates of at least 9 carbon atoms, and then heating the resulting aqueous bath at a temperature of about 90 to 103° C. until the azoic pigment is produced in a readily filterable flocculant form, said surface active agent being employed in an amount ranging from about 35 to 70 g. per gram mole of azoic pigment.

9. A process as defined in claim 8 wherein said surface active agent is sodium formaldehyde-naphthalene sulfonate.

10. In the process for producing pigments of the azo class wherein freshly prepared unstabilized diazotized 4-chloro-o-toluidine is coupled with 4-chloro-2,5-dimethoxyacetoacetanilide; the improvement which comprises effecting the coupling by admixing an aqueous bath containing said freshly prepared unstabilized diazotized compound with aqueous bath containing said 4-chloro-2,5-dimethoxyacetoacetanilide and a water-soluble anionic surface active agent selected from the group consisting of organic sulfates and sulfonates of at least 9 carbon atoms, and then heating the resulting aqueous bath at a temperature of about 90 to 103° C. until the azoic pigment is produced in a readily filterable flocculant form, said surface active agent being employed in an amount ranging from about 100 to 175 g. per gram mole of azoic pigment.

11. A process as defined in claim 10 wherein said surface active agent is sodium formaldehyde-naphthalene sulfonate.

References Cited in the file of this patent

UNITED STATES PATENTS

| | | |
|---|---|---|
| 1,082,719 | Wagner | Dec. 30, 1913 |
| 2,238,275 | Martone | Apr. 15, 1941 |
| 2,261,626 | Lang | Nov. 4, 1941 |
| 2,612,495 | Glahn et al. | Sept. 30, 1952 |